United States Patent [19]

Teraoka

[11] Patent Number: 5,709,627
[45] Date of Patent: Jan. 20, 1998

[54] DIFFERENTIAL UNIT WITH MEANS FOR MIXING AIR INTO THE HYDRAULIC ACTUATOR

[75] Inventor: Masao Teraoka, Tochigi, Japan

[73] Assignee: Tochigi Fuji Sangyo Kabushiki Kaisha, Tochigi-Ken, Japan

[21] Appl. No.: 623,325

[22] Filed: Mar. 27, 1996

[30] Foreign Application Priority Data

Mar. 28, 1995 [JP] Japan ................... 7-070083

[51] Int. Cl.$^6$ ................... F16H 48/30; F01M 11/18
[52] U.S. Cl. ................... 475/86; 475/88; 477/35; 184/6.23
[58] Field of Search ................... 475/86, 88, 84, 475/116, 117, 231, 233, 237, 238; 477/35; 184/6.23, 6.4

[56] References Cited

U.S. PATENT DOCUMENTS

| 4,715,248 | 12/1987 | Gant | 475/86 |
| 4,727,966 | 3/1988 | Hiramatsu et al. | 477/35 |
| 5,186,278 | 2/1993 | Ives et al. | 184/6.23 |
| 5,301,766 | 4/1994 | Momiyama et al. | 475/86 X |
| 5,595,214 | 1/1997 | Shaffer et al. | 475/88 X |

FOREIGN PATENT DOCUMENTS

1220946  3/1986  U.S.S.R. ................... 475/86

*Primary Examiner*—Khoi Q. Ta
*Attorney, Agent, or Firm*—Howard & Howard

[57] ABSTRACT

A differential unit having a speed-sensitive-type differential limiting function is capable of moderating the differential limiting force to maintain the controllability and stability of a vehicle. The differential unit according to the present invention includes a differential case to be rotated by drive force of an engine, a differential mechanism for distributing rotations of the differential case to a pair of output shafts, a frictional clutch for limiting the differential of the differential mechanism, a hydraulic actuator for clutching the frictional clutch, an oil pump which receives differential torque of the differential mechanism so as to be driven to operate the hydraulic actuator, control valves for introducing air to the oil suction portion of the oil pump, and a controller for opening or closing the control valve to correspond to a condition under which a vehicle is driven.

5 Claims, 8 Drawing Sheets

DIFFERENTIAL UNIT WITH MEANS FOR MIXING AIR INTO THE HYDRAULIC ACTUATOR

BACKGROUND OF THE INVENTION

The present invention relates to a differential unit for use in a vehicle.

Figure 1:
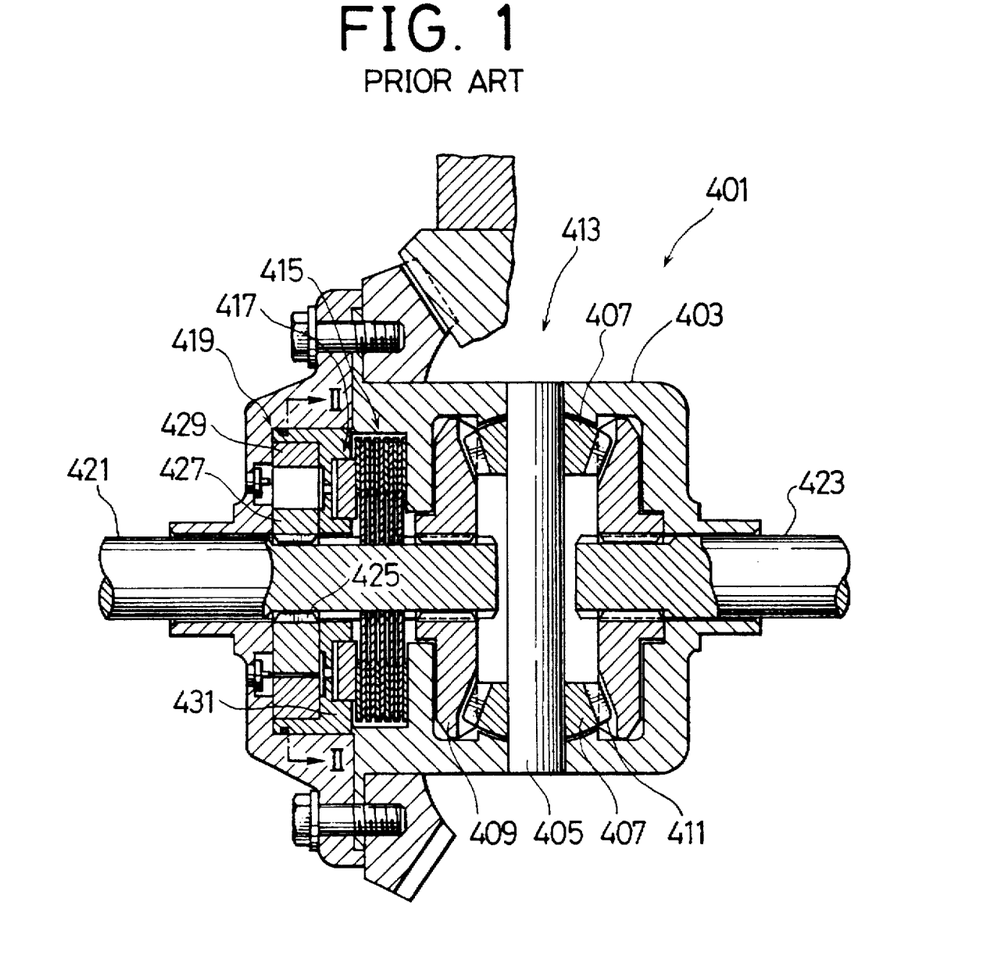
FIG. 1 is a cross sectional view of a conventional differential unit.
Figure 2:
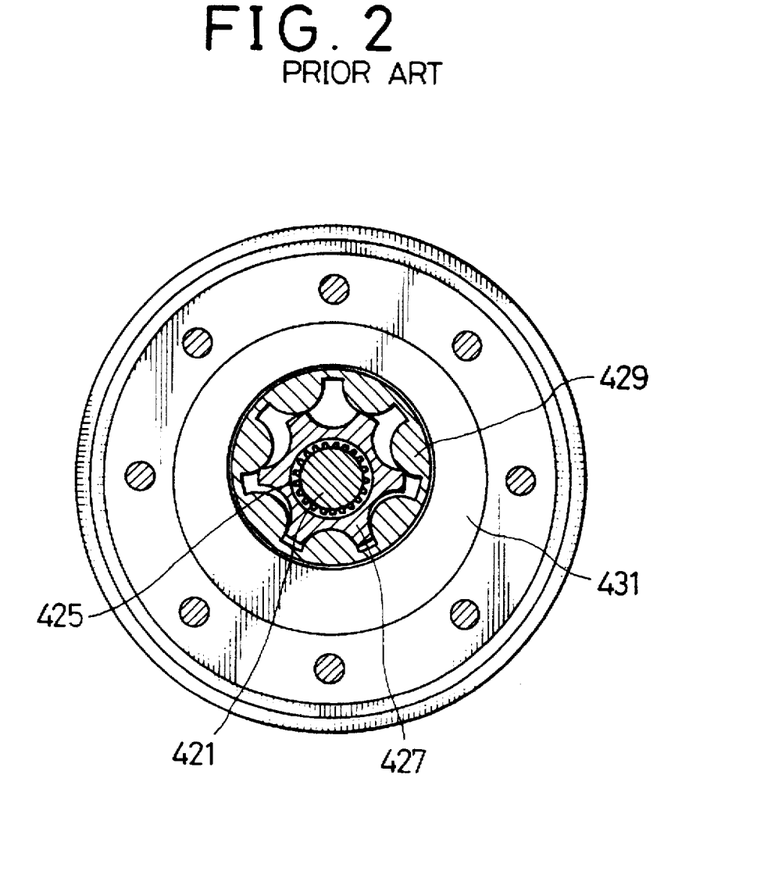
FIG. 2 is a cross sectional view taken along line II—II shown in FIG. 1.

A differential unit 401 as shown in FIG. 1 has been disclosed in U.S. Pat. No. 5,310,388. The differential unit 401 comprises a bevel-gear-type differential mechanism 413 consisting of pinion gears 407 rotatively supported adjacent to a differential case 403 through a pinion share 405 and right and left side-gears 409 and 411 to be engaged to the pinion gears 407, a multiple disc clutch 415 for limiting the differential, a hydraulic actuator 417 for clutching the multiple disc clutch 415, and an oil pump 419 for differential-operating the hydraulic actuator 417. Axle shafts 421 and 423 are spline-connected to the corresponding side gears 409 and 411.

The multiple disc clutch 415 and the oil pump 419 are disposed between the axle shaft 421 adjacent to the side gear 409 and the differential case 403. The oil pump 419 receives differential torque of the differential mechanism 413 supply hydraulic pressure to the hydraulic actuator 417 so that the multiple disc clutch 415 is clutched. Since discharge pressure from the oil pump 419 is raised as the differential rotations increases, the differential limiting torque (T) of the multiple disc clutch 415 is raised as the differential rotation difference ($\Delta N$) is enlarged, as indicated by a curve 421 shown in FIG. 3. Thus, a speed-sensitive-type differential limiting function can be realized.

Figure 3:
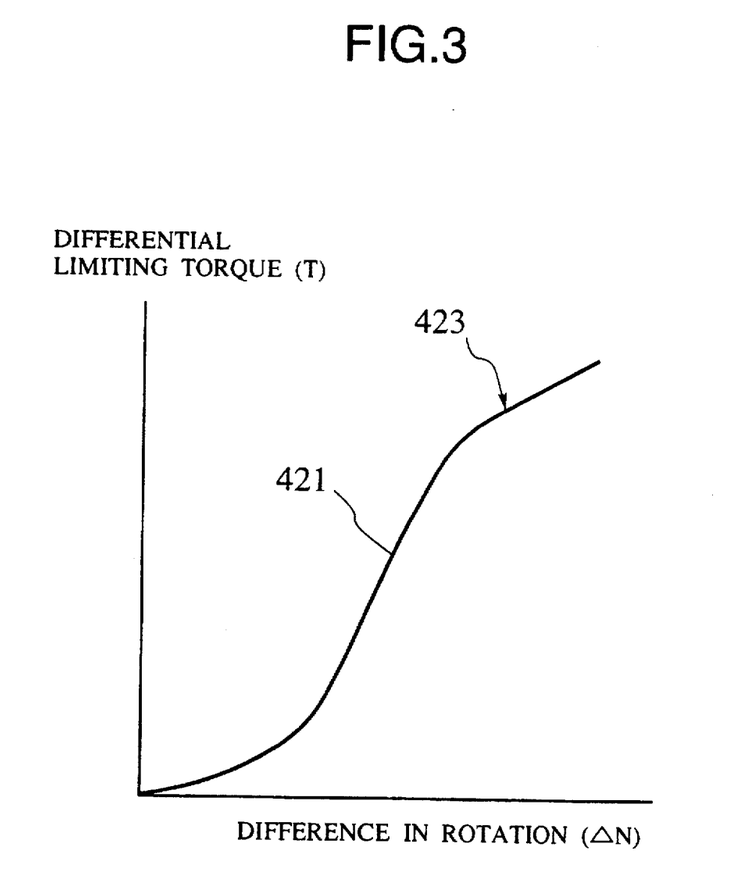
FIG. 3 is a graph showing the characteristics of the conventional differential unit.

Accordingly, if a large differential limiting torque (T) as indicated by an arrow 423 is generated during cornering of the vehicle, the vehicle encounters power oversteering. Thus, a vehicle having a high center of gravity has a risk of upset. Excess differential limiting torque (T) interferes with an A.B.S (Antilock Brake System), thus causing the car body to be unstable.

SUMMARY OF THE INVENTION

Accordingly, an object of the present invention is to provide a differential unit capable of obtaining a speed (differential rotation difference)-sensitive-type differential limiting function and moderating the differential limiting force, as the need arises, so as to maintain controllability and stability of a vehicle.

To achieve the foregoing object, according to one aspect of the present invention, there is provided a differential unit comprising: a differential case to be rotated by drive force of an engine; a differential mechanism for distributing rotation of the differential case to a pair of output shafts; a frictional clutch for limiting the differential of the differential mechanism; a hydraulic actuator for clutching the frictional clutch; an oil pump which receives differential torque of the differential mechanism to be driven to operate the hydraulic actuator; control valves for introducing air to the oil suction portion of the oil pump; and a controller for opening or closing the control valve to correspond to a condition under which a vehicle is driven.

In the differential unit, when the differential rotation has taken place, the oil pump receives the differential torque to be driven to operate the hydraulic actuator and to clutch the frictional clutch. Thus, the speed-sensitive-type differential limiting function can be obtained.

In accordance with a condition under which the vehicle is driven, for example, if the speed or the steering angle exceeds a predetermined value, or if the brake is operated, the controller opens the control valve to introduce air into the oil suction portion of the oil pump. As a result, air is mixed with oil in the hydraulic actuator so that the force for clutching the frictional clutch is moderated.

Thus, the differential limiting force can be limited to a low level when the vehicle turns at high speed or the same turns rapidly or the brake is operated. Therefore, upset of a vehicle can be prevented even if the vehicles is, for example, a truck or an off-road vehicle having a high center of gravity. The interference between the A.B.S and the differential limiting force can be prevented so that the A.B.S is operated normally and the behavior of the vehicle is stabilized.

The control valve may be of a type capable of adjusting the quantity of air to be introduced into the oil suction portion of the oil pump.

In the case where the quantity of air to be introduced is made to be adjustable, the quantity of air to be mixed with the oil can be adjusted to a desired ratio and, therefore, the differential limiting characteristic can be varied. Moreover, the differential limiting characteristic can continuously be changed. Thus, adaptations to different conditions under which the vehicle is driven and to a variety of car types can be established.

Another structure may be employed in which the differential mechanism is a bevel-gear-type differential mechanism, the frictional clutch is a multiple disc clutch disposed between the side gear of the differential mechanism and the differential case, the oil pump is a gear pump disposed between the side gear and the differential case, and the hydraulic actuator is disposed between the side gear and the oil pump.

As a result, the differential limiting force can be limited to a low level when the vehicle turns at high speed or the same turns rapidly or when the brake is operated. Thus, upset of a vehicle can be prevented even if the vehicle has a high center of gravity. Moreover, the A.B.S is able to operate normally and the behavior of the vehicle can be stabilized. In addition, the bevel-gear-type differential mechanism is able to use the reaction of the side gear to clutch the multiple disc clutch, the reaction being generated due to the engagement with the pinion gear. Therefore, the differential limiting force can be strengthened. Since the frictional clutch is the multiple disc clutch, change of the number of the clutch plates of the multiple disc clutch enables the differential limiting force to be adjusted.

An adjustment valve may be provided in place of the controller and the control valve, the adjustment valve being arranged to receive pilot pressure from the oil pump to be opened in a case where the discharge pressure from the oil pump exceeds a predetermined level so as to introduce air into the oil suction portion of the oil pump.

As a result, if the discharge pressure from the oil pump exceeds a predetermined level, the pilot pressure from the oil pump opens the control valve so that air is introduced into the oil suction portion of the oil pump. Thus, air is mixed with oil in the hydraulic actuator so that the force for clutching the frictional clutch is reduced. As a result, a rise in the differential limiting force can be restrained to a low level.

Therefore, a setting performed such that the discharge pressure from the oil pump exceeds a predetermined level if the car speed or the steering angle is raised to a predetermined value enables the vehicle to be prevented from being upset in a case where a vehicle having a high center of gravity turns at high speed or the same turns rapidly.

The structure may be arranged to comprise oil-temperature detection means for detecting the temperature of oil which passes through the oil pump, wherein the controller opens the control valve in a state where the temperature of oil passing through the oil pump is low so as to introduce air into the oil suction portion of the oil pump.

As a result of the foregoing structure, even in a state where the temperature of oil is low under which the viscosity of oil can be raised, the quantity of leakage of oil from the oil pump can be reduced, the pressure (oil discharge pressure) in the hydraulic actuator can be raised and the force for clutching the frictional clutch can be enlarged, air is mixed with oil to be sucked by the oil pump. As a result, a rise in the oil discharge pressure can be prevented. Therefore, excess differential limiting forces can appropriately be prevented. Moreover, stable differential limitation free from a influence due to change in the temperature of oil can be performed.

Other and further objects, features and advantages of the invention will be evident from the following detailed description of the preferred embodiments taken in conjunction with the attached drawings.

DESCRIPTION OF THE PREFERRED EMBODIMENTS

A first embodiment of the present invention will now be described with reference to the drawings.

Figure 4:
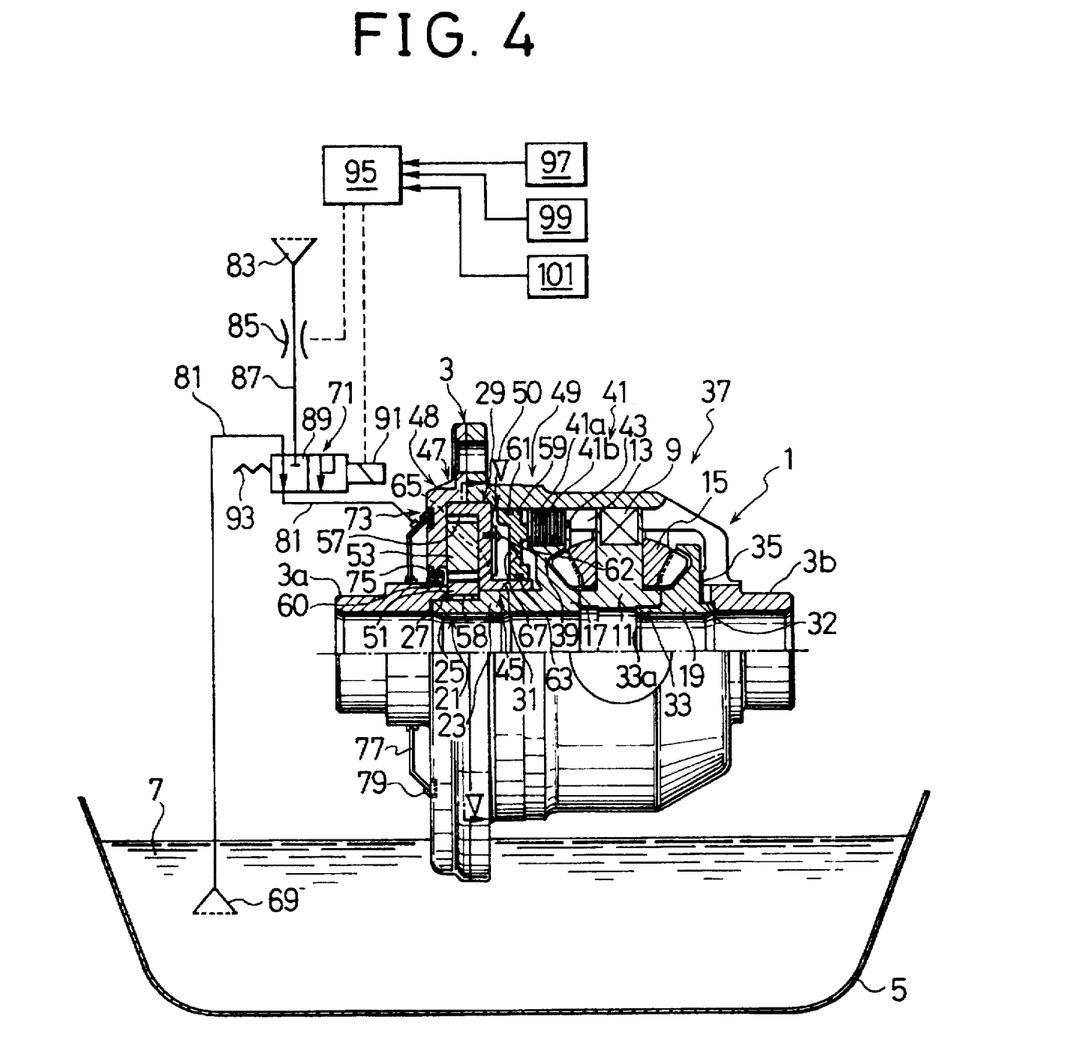
FIG. 4 is a cross sectional view of a differential unit according to a first embodiment of the present invention.
Figure 5:
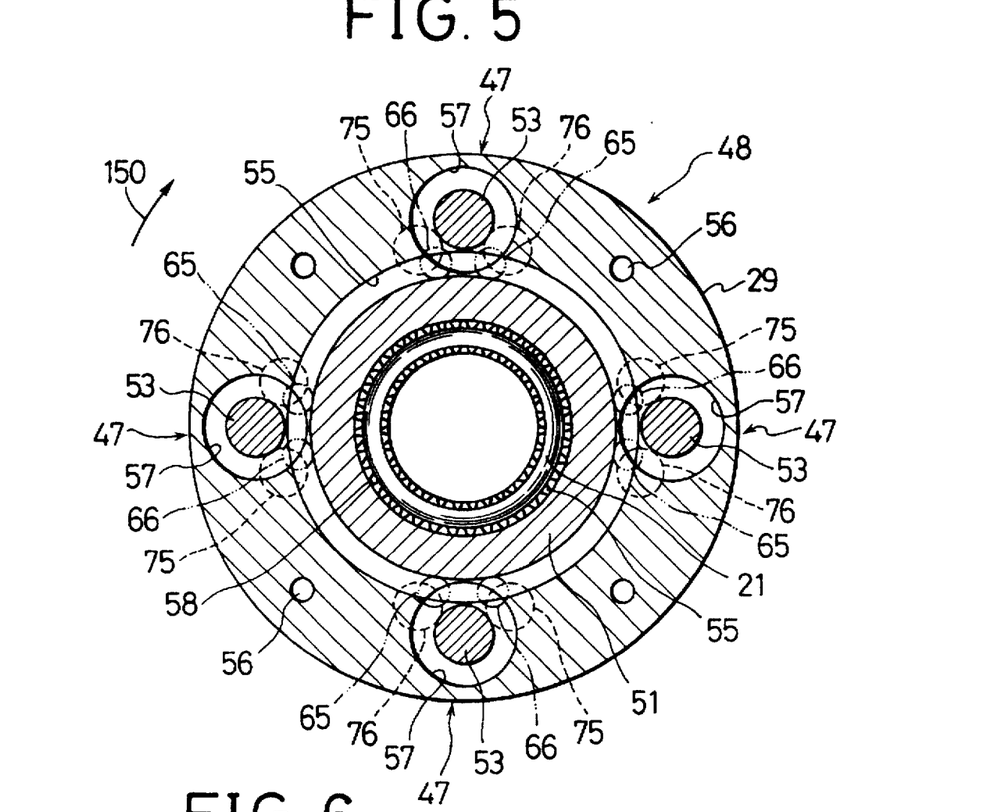
FIG. 5 is a cross sectional view taken along line V—V shown in FIG. 4.
Figure 6:
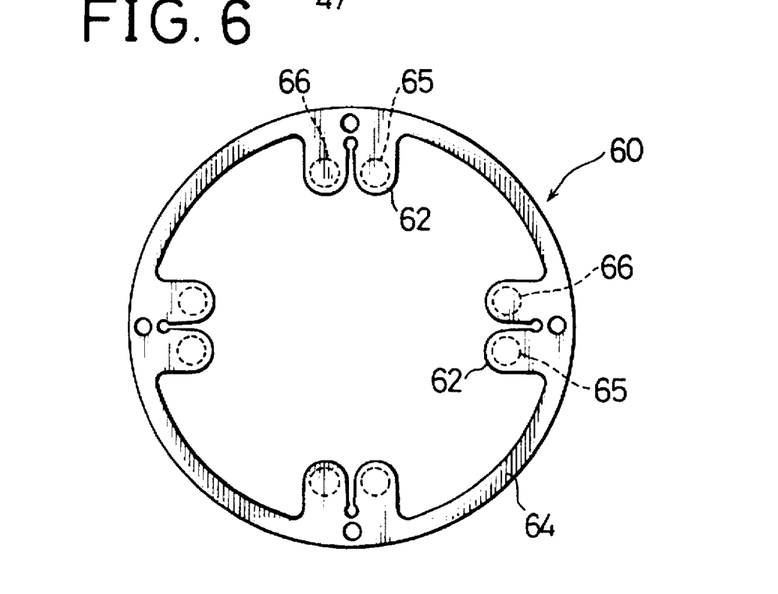
FIG. 6 is a plan view of a valve plate.

FIG. 4 is a cross sectional view showing a differential unit according to a first embodiment of the present invention. FIG. 5 is a cross sectional view taken along line V-V shown in FIG. 4. FIG. 6 is a plan view showing a valve plate. The lateral direction is the lateral direction of FIG. 4. Note that elements given no reference numeral are omitted from illustration.

As shown in FIG. 4, the differential unit 1 is, by boss portions 3a and 3b formed at horizontal ends of a differential case 3, rotatively supported by a differential carrier 5 through a bearing.

The differential carrier 5 for rotatively supporting the differential unit 1 has an oil reservoir 7.

The differential case 3 includes pinion shafts 9 disposed radially relative to a boss portion 11. One end of each pinion shaft 9 is, at the end thereof, received in a groove 13 of the differential case 3 while being permitted to be moved in the axial direction. A pinion gear 15 is rotatively supported on each of the pinion shafts 9.

The differential case 3 includes fight and left side-gears 17 and 19. The left side-gear 17 (one of the side gears 17 and 19) is disposed on the outer surface of the inner end of a boss portion 21 connected to a left output shaft. The boss portion 21 is formed into a two-step shape consisting of a large-diameter boss portion 23 and a small-diameter boss portion 25 formed toward the left in the axial direction. The left side-gear 17 is, at the small-diameter boss portion 25 thereof, rotatively supported by a supporting portion 27 of the differential case 3 and, at the large-diameter boss portion 23 thereof, rotatively supported on the inner surface of a boss portion 31 of a pump case 29 to be described later. The right side-gear (the other side gear) 19 is disposed while being shifted from the inner end surface of a boss portion 33, to be connected to the fight output shaft, toward the right in the axial direction (outwardly in the axial direction). The right side-gear 19 is, at a boss portion 32, rotatively supported by the differential case 3 and, at a boss portion 33, rotatively supported on the inner surface of the boss portion 11 of the pinion shaft 9. A washer 35 is disposed between the right side-gear 19 and the differential case 3.

Thus, a bevel-gear-type differential mechanism 37 is formed. The pinion shaft 9, the pinion gear 15 and the side gears 17 and 19 of the differential mechanism 37 can be moved in the axial direction for an appropriate distance.

The force for rotating the differential case 3 is distributed from the pinion shaft 9 to the right and left side-gears 17 and 19 through the pinion gear 15 so as to be transmitted to the right and left output shafts. When a difference in the drive resistance has arisen between the right and left output shafts, the rotations of the pinion gear 15 results in the drive force from the engine being differential-distributed to the right and left portions.

The outer surface of each of the side gears 17 and 19 is extended to a position near the back surface (an outer surface of the differential case 3 in the radial direction) of the pinion gear 9.

Between an outer portion 39 of the left side-gear 17 and the differential case 3, there is disposed a multiple disc clutch (a frictional clutch) 41 so that slide friction takes place at the outermost portion on the outside of the multiple disc clutch 41 in the radial direction from the differential mechanism 37 in the differential case 3. The multiple disc clutch 41 consists of a plurality of outer clutch plates 41a spline-connected to the inner surface of the differential case 3 and permitted to be moved in the axial direction; and a plurality of inner clutch plates 41b spline-connected to the outer portion 39 of the left side-gear 17 and permitted to be moved in the axial direction. The outer clutch plates 41a and the inner clutch plates 41b are disposed alternately. Between the right end of the multiple disc clutch 41 and the differential case 3, there is disposed a back ring 43.

Between the back surface of the left side-gear 17 and the differential case 3, there is formed a space 45. In the space 45, a circumscribed-type gear pump (an oil pump) 47 and a hydraulic actuator 49 are disposed between the left side-gear 17 and the differential case 3.

As shown in FIG. 5, the gear pump 47 consists of a plurality of (four in this embodiment) pumps formed by a large-diameter gear 51 disposed in the pump case 29 and a plurality of small-diameter gears 53 to be respectively engaged to the large-diameter gear 51.

The pump case 29 is press-fit to the differential case 3 in such a manner that its outer surface faces the inner surface of the differential case 3. The pump case 29 being secured to the differential case 3 with bolts 56 so as to support the large-diameter boss portion 23 of the left side-gear 17 on the inner surface of the boss portion 31 thereof.

The pump case 29 has a first accommodation hole 55 formed coaxially with the differential case 3 and four second accommodation holes 57 formed at the same intervals in the circumferential direction of the first accommodation hole 55. The second accommodation holes 57 are allowed to communicate with the first accommodation hole 55 in the radial direction. The first accommodation hole 55 rotatively accommodates the large-diameter gear 51 secured, by a spline 58, to the outer surface of the small-diameter boss portion 25 of the left side-gear 17. The second accommodation holes 57 respectively rotatively accommodate small-diameter gears 53. The small-diameter gears 53 are engaged to the large-diameter gear 51 in the communication portions with the first accommodation hole 55 so that the pump is formed at each engagement portion between the gears 51 and 53. Since the four small-diameter gears 53 are engaged to the large-diameter gear 51 in this embodiment, four pumps are formed. A valve plate 60 as shown in FIG. 6 is attached to the pump case 29 by bolts 62. Four projections 62 are formed at equal intervals in the circumferential direction of the valve plate 60 and are in contact with respective discharge openings 65 of the pump case 29. When differential rotation between the side gear 17 and the differential case 3 has been raised to a predetermined rotation or higher and thus a discharge pressure has been generated, the projections 62 act as lead valves to apply hydraulic pressure to the hydraulic actuator 49. The valve plate 60 has the projections 62 integrally connected to one another by arms 64 to decrease the number of parts and improve the positioning characteristic.

The hydraulic actuator 49 is disposed between the multiple disc clutch (the frictional clutch) 41 and the gear pump 47. A piston 59 of the hydraulic actuator 49 is moveable in the axial direction and sealed through seals 61 and 63 between the outer surface of the boss portion 31 of the pump case 29 of the gear pumps 47 and the differential case 3. An inner wall 50 of the differential case 3 forms a portion of the hydraulic actuator 49.

When differential rotations take place with the differential mechanism 37 and thus the pump case 29 rotates in a direction indicated by an arrow 150 prior to the rotations of the large-diameter gear 51, the small-diameter gear 53 of the gear pumps 47 rotates in the second accommodation holes 57 hydraulic oil is sucked into the accommodation holes 55 and 57 through a suction opening 75 formed in the side wall of the differential case 3, and hydraulic oil is discharged through a discharge openings 65 of the pump case 29. Thus, hydraulic pressure is applied to the hydraulic actuator 49. The hydraulic actuator 49 presses the multiple disc clutch 41 through the piston 59 so that the multiple disc clutch 41 is clutched. When the multiple disc clutch 41 is clutched to the resistance generated when the gear pumps 47 sucks hydraulic oil and, the relative rotations between the side gear 17 and the differential case 3 are limited so that the differential rotations of the differential mechanism 37 are limited. The piston 59 has orifices 67 to release the pressure of the oil or air.

When the large-diameter gear 51 rotates in the direction indicated by the arrow 150 prior to the pump case 29, hydraulic oil is sucked into the accommodation holes 55 and 57 through a suction opening 76 and hydraulic oil is discharged through the discharge opening 66 of the pump case 29 so that hydraulic pressure is applied to the hydraulic actuator 49. Thus, the difference rotations of the differential mechanism 37 are limited similar to the foregoing case.

The gear pump 47 sucks oil from the oil reservoir 7 provided for the differential carrier 5 through an oil filter 69, an opening/closing control valve 71, an oil connector 73 and the oil suction opening 75.

The oil connector 73 consists of a hollow member 77 secured to the differential carrier 5 in the rotational direction and a slide ring 79 comprising an elastic member having a wire ring and attached to the hollow member 77. The slide ring 79 has, in the inner surface thereof, a circular groove, always communicates with an oil opening formed in the hollow member 77. The slide ring 79 is secured to the differential case 3 to slide to and from the hollow member 77 when the differential case 3 is rotated so that discharge of hydraulic oil introduced through the oil opening is prevented.

In addition to an oil pipe 81, an air pipe 87 for introducing air through an air filter 83 and a flow control valve 85 is connected to the suction port of the opening/closing control valve 71. The flow control valve 85 constitutes a control valve together with the opening/closing control valve 71. A spool 89 of the opening/closing control valve 71 is moved by a solenoid 91 and a spring 93 so as to be shifted between a position shown in FIG. 4, at which it interrupts air to cause oil to flow, and a position, at which it causes both air and oil to flow so as to mix air with oil.

The position of the opening/closing control valve 71 is switched by a controller 95 through a solenoid 91. The controller 95 adjusts the angular degree of opening of the flow control valve 85 to adjust the quantity of air to be mixed with oil.

The controller 95 receives a car-speed signal transmitted from a car-speed sensor 97, a brake on-off signal transmitted from a brake sensor 99 and a steering-angle signal transmitted from a steering-angle sensor 101. In response to the foregoing signals, the controller 95 switches the opening/closing control valve 71 to the position at which air is interrupted and oil is allowed to flow when the car speed is, for example, 40 km/h or lower. If the car speed is higher than 40 km/h or the brake pedal has been operated or the steering angle is larger than a predetermined angular degree, the controller 95 switches the opening/closing control valve 71 to the position at which both air and oil are introduced.

Figure 7:
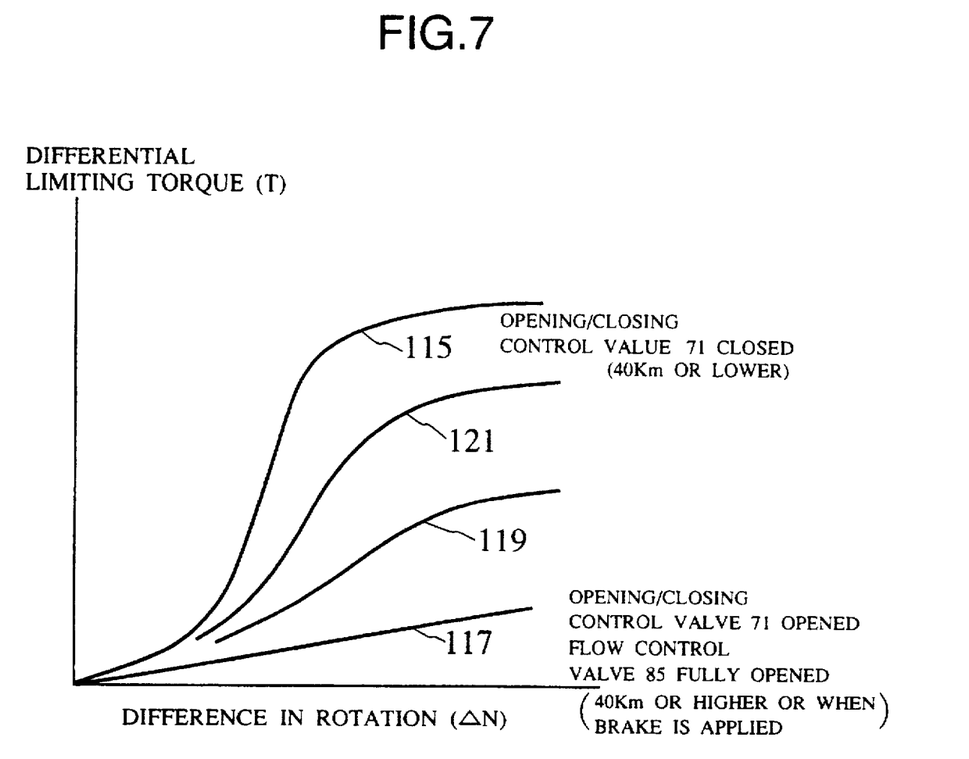
FIG. 7 is a graph showing the characteristics of the differential unit according to the first embodiment.

FIG. 7 shows the change in the differential limiting characteristic of the differential unit 1 when the opening/closing control valve 71 and the flow control valve 85 are controlled. A curve 115 shows the characteristic realized when air has been interrupted by closing the opening/closing control valve 71. A curve 117 shows the characteristic realized when the opening/closing control valve 71 has been opened and the flow control valve 85 has been fully opened to mix air.

When air is interrupted, only oil is supplied to the gear pumps 47. When the rotation difference ($\Delta N$) is enlarged as indicated by the curve 115, the differential limiting torque (T) is raised rapidly. When air is mixed with oil, the discharge pressure of the gear pumps 47 is lowered so that the force for clutching the multiple disc clutch 41 is reduced. Thus, the rise in the differential limiting torque (T) can be limited as indicated by the curve 117.

When a flow control valve 85 is gradually closed while air is mixed, the differential limiting torque (T) is raised as indicated by curves 119 and 121 so that various differential limiting characteristics are realized. Moreover, the differential limiting characteristic can continuously be changed between the curves 115 and 117.

The differential unit 1 is formed as described above.

The differential unit 1 mounted on a vehicle acts as follows: if either of the right and left output shafts rotates idly due to rough road or the like, the gear pump 47 is operated so that hydraulic pressure is applied to the hydraulic actuator 49. Thus, the multiple disc clutch 41 is pressed and clutched through the piston 59. As a result, a large differential limiting force can be generated so that the drive force of the engine is supplied to another output shaft through the differential unit 1. Thus, rough-road driving capability can be improved. When the vehicle turns moderately with a small differential rotational frequency, the differential limiting force is reduced so that the vehicle is enabled to be smoothly and stably turned.

In the case where the running speed is higher than 40 km/h, the differential limiting force can be reduced to a low level as described above, power oversteering can be prevented even if the vehicle turns rapidly or turns at high speed. Thus, even if the vehicle has a high center of gravity, as has a truck or an off-road vehicle, upset can be prevented. Even if the brake is operated, the differential limiting force is moderated to prevent interference with the A.B.S. Thus, the A.B.S can normally be operated so that the behavior of the car body is stabilized when the brake is operated.

The structure is arranged such that the quantity of air to be mixed can be controlled by the flow control valve 85 to be adaptable to various conditions under which the vehicle is driven. Thus, an optimum differential limiting characteristic can be realized for each of different conditions under which the vehicle is driven. As a result, the driving stability of the vehicle can significantly be improved.

The bevel-gear-type differential mechanism 37 enables the reaction of the side gears 17 and 19 generated due to the engagement with the pinion gear 15 to be used to clutch the multiple disc clutch 41. Therefore, the differential limiting force can be strengthened. Moreover, change a in the number of the clutch plates of the multiple disc clutch 41 enables the differential limiting force to be adjusted.

Since the oil pump 48 consists of four pumps formed by the large-diameter gear 51 and four small-diameter gears 53 disposed around the large-diameter gear 51, the quantity of discharge from the oil pump 48 can be increased. Thus, the quantity of oil to be discharged can be increased so that a stable differential limiting characteristic is obtained even if the difference ($\Delta N$) in the differential rotations is low.

Moreover, the left side-gear 17 is integrally formed on the outer surface at the inner end of the boss portion 21 which is connected to either of the output shafts. The multiple disc clutch 41 is disposed between the outer portion 39 of the left side-gear 17 and the differential case 3 and the right side-gear 19 is formed while being outwardly shifted in the axial direction from the inner end surface 33a of the boss portion 33, which is connected to another output shaft. Thus, the center of the right and left output shafts can be positioned in the central portion of a bearing span for supporting the right and left end boss portions 3a and 3b of the differential case 3.

Therefore, the differential case 3 adapted to the differential unit 1 can be employed in a vehicle having a standard differential unit with no differential limiting function. That is, the structure of the differential unit 1 has compatibility in mounting with respect to a standard differential unit. As a result, since only one differential carrier is required to be manufactured, the costs of the differential unit and the differential carrier can be reduced.

Since the inner wall 50 of the differential case 3 forms a portion of the hydraulic actuator 49, the hydraulic actuator 49 can be positioned on the outside in the radial direction. Thus, driving stability can be improved when the vehicle runs at high speed with high rotational frequency of the differential case 3, particularly when the vehicle moves straight. The foregoing effect can be obtained regardless of differential rotation between the differential case 3 and the left side-gear 17 and without dependency upon the adjustment of the opening/closing control valve 71 performed by the controller 95. Since the multiple disc clutches 41 can be, near the inner wall 50 of the differential case 3, disposed on the circumference of the same axis of the hydraulic actuator 49, large differential limiting force can be obtained.

A second embodiment of the present invention will now be described.

Figure 8:
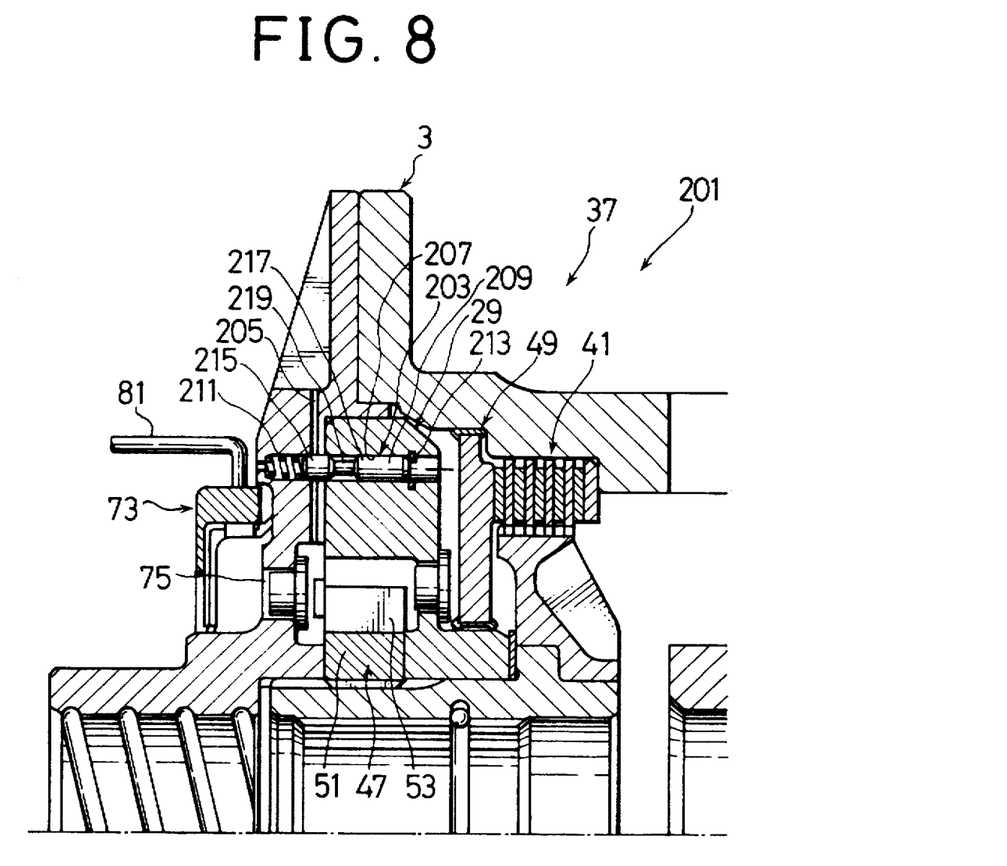
FIG. 8 is an enlarged cross sectional view showing essential portions of a differential unit according to a second embodiment of the present invention.

FIG. 8 is a cross sectional view showing a differential unit according to a second embodiment of the present invention. The differential unit according to this embodiment has a spool valve serving as an adjustment valve in place of the control valve and the controller according to the first embodiment. Therefore, elements having the same functions are given the same reference numerals and they are omitted from description. The description will hereinafter be directed to the different features. Note that the lateral direction is the lateral direction of FIG. 8.

As shown in FIG. 8, the differential unit 201 according to this embodiment comprises a differential case 3, a differential mechanism 37, a multiple disc clutch (a frictional clutch) 41, a hydraulic actuator 49, a gear pump (an oil pump) 47 and spool valve (an adjustment valve) 203.

The differential case 3 has an air suction port 205 to allow an oil suction opening 75 to communicate air into an oil suction opening 75. The spool valve 203 comprises a spool sliding opening 207, a spool 209, a spring 211 and a locating member 213. The spool valve is included in the inner portion of the differential case 3.

The spool slide opening 207 is formed to penetrate the differential case 3 from the pump case 29 and intersect the air suction port 205. The spool slide opening 207 having a right end opened toward the hydraulic actuator 49.

The spool 209 is formed into a bobbin shape by thinning the intermediate portion of a column and has large-diameter portions 215 and 217 at its two ends. The large-diameter portions 215 and 217 have substantially the same diameters. Moreover, the spool 209 has, in the intermediate portion thereof, small-diameter portion 219, the diameter of which is smaller than those of the two ends. The spool 209 is disposed in the spool slide opening 207 in such a manner that the large-diameter portions 215 and 217 are able to slide along the inner surface (a cylindrical sliding surface) of the spool slide opening 207. The end surface of the right portion (the opened surface) of the spool 209 receives pilot pressure of oil discharged from the gear pump 47 toward the multiple disc clutch 41.

The spring 211 is disposed in the bottom portion of the spool slide opening 207 to urge the spool 209 to the right (toward the opening of the spool slide opening 207). The locating member 213 is disposed on the inner surface of the opened side of the spool slide opening 207 to limit the rightward movement of the spool 209. The locating member 213 is disposed at a position at which the large-diameter portion 215 of the spool 209 (adjacent to the spring 211 closes) the air suction port 205 when the spool 209 is positioned at the rightmost position.

When the spool 209 is in a non-load state in which it does not receive the pilot pressure (leftward force) from the gear pump 47 or when the pilot pressure is lower than a predetermined level (the urging force of the spring 211), the spool 209 is positioned to the rightmost position (the position shown in FIG. 8) by the spring 211 and the locating member 213. As a result, the air suction port 205 is maintained closed. After the oil discharge pressure from the gear pump 47 has been raised and thus the pilot pressure has been raised to a level higher than a predetermined level, the spool 209 is moved to the left. The small-diameter portion 219 reaches the air suction port 205. When the small-diameter portion 219 has reached the air suction port 205, the air suction port 205 is opened so that air is introduced into the oil suction opening 75. When air has been introduced into the oil suction opening 75, air is mixed with oil in the hydraulic actuator 49 similar to the first embodiment. Thus, the force for clutching the multiple disc clutch 41 is reduced so that rise in the differential limiting force is prevented.

Therefore, by setting if the member properly the oil discharge pressure (the pilot pressure) from the gear pump 47 exceeds a predetermined level in the case where the car speed or the steering angle exceeds a predetermined value, upset of a vehicle having a high center of gravity occurring when the vehicle turns at high speed or rapidly can be prevented. That is, a costly part, such as the controller, is not required a compact structure in which the spool valve 203 is included in the differential case 3 enables an effect and the operation similar to those obtainable from the first embodiment to be attained.

A third embodiment of the present invention will now be described with reference to the drawing.

Figure 9:
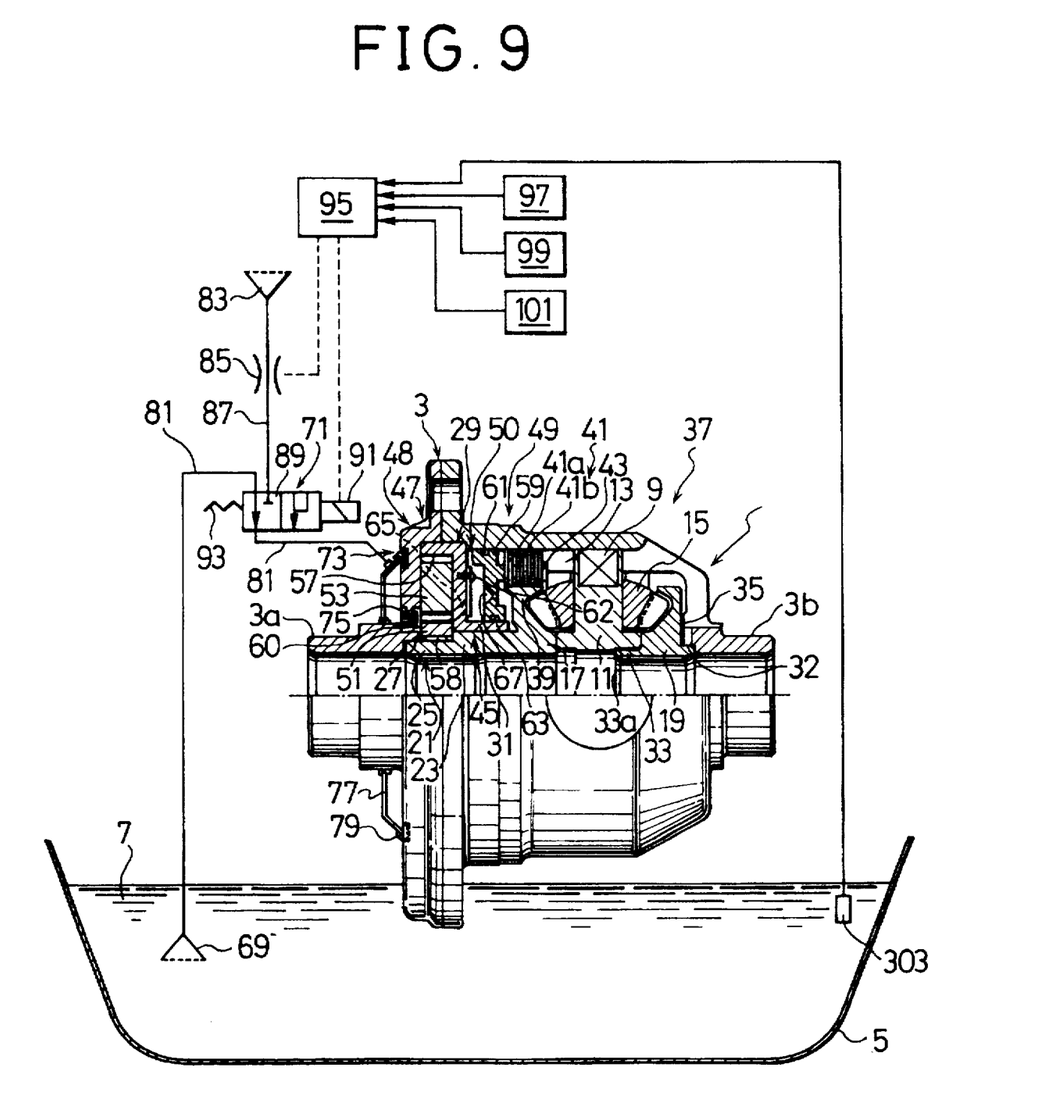
FIG. 9 is a cross sectional view of a differential unit according to a third embodiment of the present invention.

FIG. 9 is a cross sectional view showing a differential unit according to the third embodiment of the present invention. This embodiment is characterized in that, in addition to the structure of the first embodiment, the controller opens the control valve in such a manner that air can be introduced toward the oil suction portion of the gear pump when the temperature of oil is low. Therefore, elements having the same functions as those of the first embodiment are given the same reference numerals and they are omitted from description. Then, the description will be performed mainly about the different portions.

As shown in FIG. 9, the differential unit 301 comprises, a differential case 3, a differential mechanism 37, a multiple disc clutch (the frictional clutch) 41, a hydraulic actuator 49, the gear pump (the oil pump) 47, a opening/closing control valve 71, a flow control valve (the control valve) 85, a controller 95 and an oil-temperature sensor (a temperature detection means) 303.

The oil-temperature sensor 303 detects the temperature of oil (oil temperature) reserved in the oil reservoir 7 to output the result of the detection to the controller 95. Since oil frequently circulates from the oil reservoir 7 to the gear pump 47 and the hydraulic actuator 49, the oil-temperature sensor 303 is able to indirectly detect the temperature of oil which passes through the gear pump 47. The oil temperatures detected by the oil-temperature sensor 303 are successively supplied to the controller 95.

The controller 95 responds to a car-speed signal supplied from a car-speed sensor 97, brake on-off signal supplied from a brake sensor 99, a steering-angle signal supplied from a steering-angle sensor 101, and the oil temperature signal from the oil-temperature sensor 303 to control opening or closing of the opening/closing control valve 71 and the flow control valve 85. Specifically, in a case where the opening/closing control valve 71 has been closed in response to the car-speed signal or the like, if the detected oil temperature is lower than a predetermined level, the controller 95 opens the opening/closing control valve 71 and the flow control valve 85 to introduce air toward the oil suction portion of the gear pump 47 so as to mix air with oil. In the foregoing low oil temperature state, the viscosity of oil can be raised, the quantity of oil leakage from the gear pump 47 can be reduced, the pressure (the oil discharge pressure) in the hydraulic actuator 49 can be raised and the force for clutching the multiple disc clutch 41 can be increased. Therefore, air is mixed with oil to prevent the foregoing problems. If the control is performed in the foregoing low oil temperature state such that the degree of opening of the flow control valve 85 is enlarged as the oil temperature is lowered, enlargement of the force for clutching the multiple disc clutch 41 can further appropriately be moderated as the oil temperature is lowered.

That is, even in the low temperature state in which the viscosity of oil can be raised, the quantity of oil leakage from the gear pump 47 is increased, the pressure (the oil discharge pressure) in the hydraulic actuator 49 may be raised and the force for clutching the multiple disc clutch 41 may be increased, air is mixed with oil to be sucked by the gear pump 47 in the differential unit 301 having the foregoing structure. Therefore, the rise in the oil discharge pressure can be prevented so that excess differential limiting force is appropriately prevented. Therefore, stable differential limiting operation can be performed and the driving stability can further be improved without influence from the change in oil temperature occurring due to a variety of factors, such as the driving environment of the vehicle, whether or not the driving has been just started and whether or not the vehicle is being driven continuously.

Although both of the opening/closing control valve 71 and the flow control valve 85 are provided as the control valves in the first and third embodiments, at least either of the foregoing valves may be provided. That is, if only the opening/closing control valve 71 is provided, switching between the air interruption state and the mixture state can be performed. If only the flow control valve 85 is provided, the quantity of mixture of air can continuously be adjusted. Accordingly, use of the flow control valve also having an air interruption function enables switching between the air interruption state and the mixture state and continuous adjustment of the quantity of air to be mixed to be performed by only the flow control valve.

In the structure according to the first to third embodiments arranged such that the frictional clutch is disposed between the side gear and the differential case, a frictional clutch may be disposed between each of the two side gears and the differential case. Since oil for generating differential limiting force also serves as oil for lubricating the portion of the differential unit in the differential carrier, piping to the outside of the unit is not required and, therefore, the structure of the apparatus can be simplified.

In the present invention, for example, a lateral-G (gravitational acceleration) sensor or the like may be employed to supply or interrupt air or adjust the air flow to correspond to the condition under which the vehicle is driven, such as the turning acceleration, as well as the car-speed and the state where the brake is turned on or off. If the foregoing conditions are set to correspond to the type of the vehicle whether the vehicle is a passenger car or a truck or whether it is an on-road vehicle or an off-road vehicle, wide adaptation to a variety of vehicle types can be performed.

The differential mechanism is not limited to the bevel-gear-type differential mechanism. For example, a differential mechanism may be employed which uses the frictional force between the tooth surfaces of gears or the frictional resistance between the gear and the differential case to obtain torque-sensitive differential limiting force. If the foregoing differential mechanism is employed, a differential unit can be obtained which has both torque-sensitive differential limiting function and the foregoing speed-sensitive differential limiting function realized by the frictional clutch.

The frictional clutch is not limited to the multiple disc clutch. For example, a cone clutch may be employed.

The differential unit according to the present invention is not limited to the rear differential unit (a differential unit for the axle shafts for the rear wheels). The differential unit may be used as a front differential unit (a differential unit for the axle shafts for the front wheels) or a center differential unit (a differential unit which distributes the drive force of the engine to the front wheels and the rear wheels).

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is clamed is:

1. A differential unit comprising:

a differential case to be rotated by drive force of an engine;

a differential mechanism for distributing rotations of said differential case to a pair of output shares;

a frictional clutch for limiting the differential of said differential mechanism;

a hydraulic actuator for clutching said frictional clutch;

an oil pump which receives differential torque of said differential mechanism so as to be driven to operate said hydraulic actuator;

a control valve for introducing air to an oil suction portion of said oil pump; and a controller for opening or closing said control valve to correspond to a condition under which a vehicle is driven.

2. A differential unit according to claim 1, wherein said control valve is able to adjust the quantity of air to be introduced into the oil suction portion of said oil pump.

3. A differential unit according to claim 1, wherein said differential mechanism is a bevel-gear-type differential mechanism having a pinion gear rotatively supported at a position adjacent to said differential case and a pair of output side-gears engaged to said pinion gear, said frictional clutch is a multiple disc clutch disposed between said side gear and said differential case, said oil pump is disposed between said side gear and said differential case, and said hydraulic actuator is disposed between said side gear and said oil pump.

4. A differential unit comprising:

a differential case to be rotated by the drive force of an engine;

a differential mechanism for distributing rotations of said differential case to a pair of output shafts;

a frictional clutch for limiting the differential of said differential mechanism;

a hydraulic actuator for clutching said frictional clutch;

an oil pump which receives differential torque of said differential mechanism so as to be driven to operate said hydraulic actuator; and an adjustment valve which receives pilot pressure from said oil pump to be opened in a case where the discharge pressure from said oil pump exceeds a predetermined level so as to introduce air into the oil suction portion of said oil pump.

5. A differential unit according to claim 1, further comprising oil-temperature detection means for detecting the temperature of oil which passes through said oil pump, wherein said controller opens or closes said control valve in accordance with the temperature detected by said oil-temperature detection means.

* * * * *